(12) United States Patent
Tsujii et al.

(10) Patent No.: US 9,695,769 B2
(45) Date of Patent: Jul. 4, 2017

(54) AIR FLOW RATE ADJUSTING APPARATUS

(71) Applicant: DENSO CORPORATION, Kariya, Aichi-pref. (JP)

(72) Inventors: Hidehito Tsujii, Obu (JP); Takao Ban, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 331 days.

(21) Appl. No.: 14/303,249

(22) Filed: Jun. 12, 2014

(65) Prior Publication Data

US 2014/0366607 A1 Dec. 18, 2014

(30) Foreign Application Priority Data

Jun. 12, 2013 (JP) .................. 2013-124214

(51) Int. Cl.
*G01F 1/68* (2006.01)
*F02D 41/18* (2006.01)
*G01F 25/00* (2006.01)
*G01F 1/684* (2006.01)
*G01F 5/00* (2006.01)
*F02D 41/24* (2006.01)
*G05D 7/06* (2006.01)

(52) U.S. Cl.
CPC ......... *F02D 41/18* (2013.01); *F02D 41/2432* (2013.01); *G01F 1/684* (2013.01); *G01F 1/6842* (2013.01); *G01F 1/6845* (2013.01); *G01F 5/00* (2013.01); *G01F 25/0053* (2013.01); *G05D 7/0635* (2013.01)

(58) Field of Classification Search
CPC ... G01F 1/6842; G01F 1/6847; G01F 25/0053
See application file for complete search history.

(56) References Cited

U.S. PATENT DOCUMENTS

2009/0319189 A1* 12/2009 Cornett ................... G01W 1/02
702/3
2010/0313651 A1 12/2010 Hidaka et al.
2012/0103084 A1* 5/2012 Ooga ................... G01F 1/6842
73/204.25

FOREIGN PATENT DOCUMENTS

JP 2005-037404 2/2005
JP 2010-281809 12/2010

* cited by examiner

*Primary Examiner* — Laura Martin
*Assistant Examiner* — Alex Devito
(74) *Attorney, Agent, or Firm* — Nixon & Vanderhye P.C.

(57) ABSTRACT

An air flow rate adjusting apparatus adjusts an output of an air flow meter based on a dimension of a gap between a back surface of a sensor chip and a bottom surface of a recess of a support plate.

15 Claims, 5 Drawing Sheets

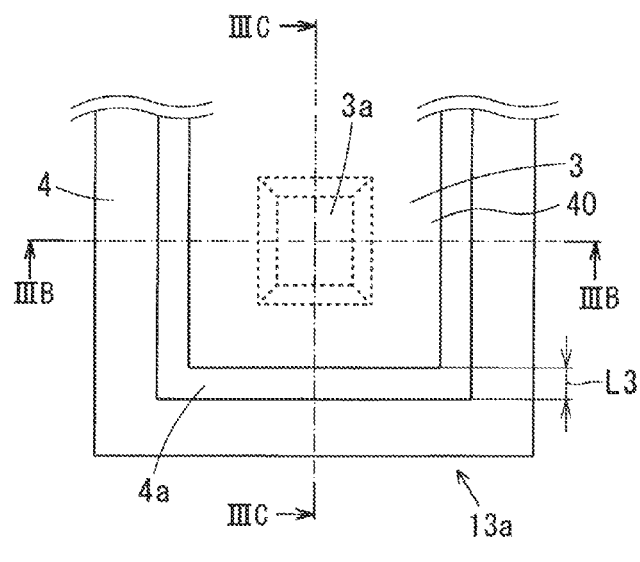
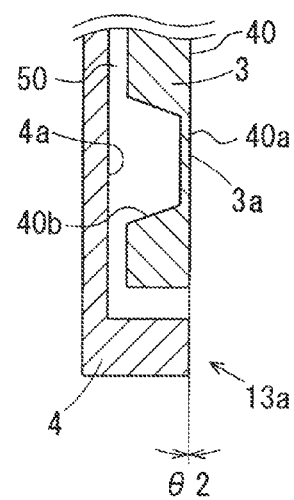
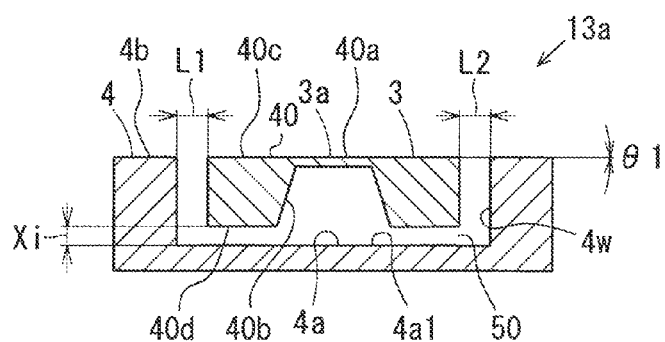
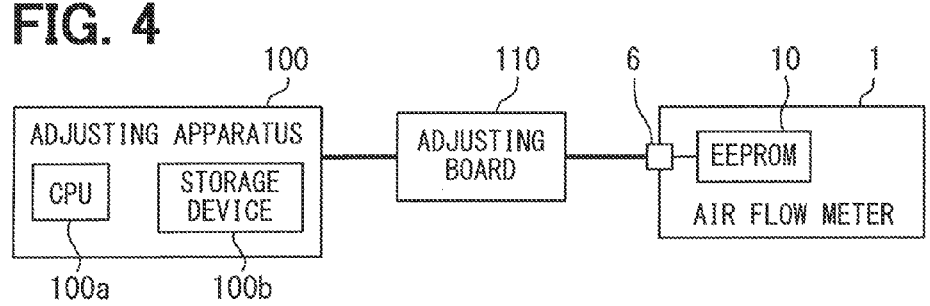

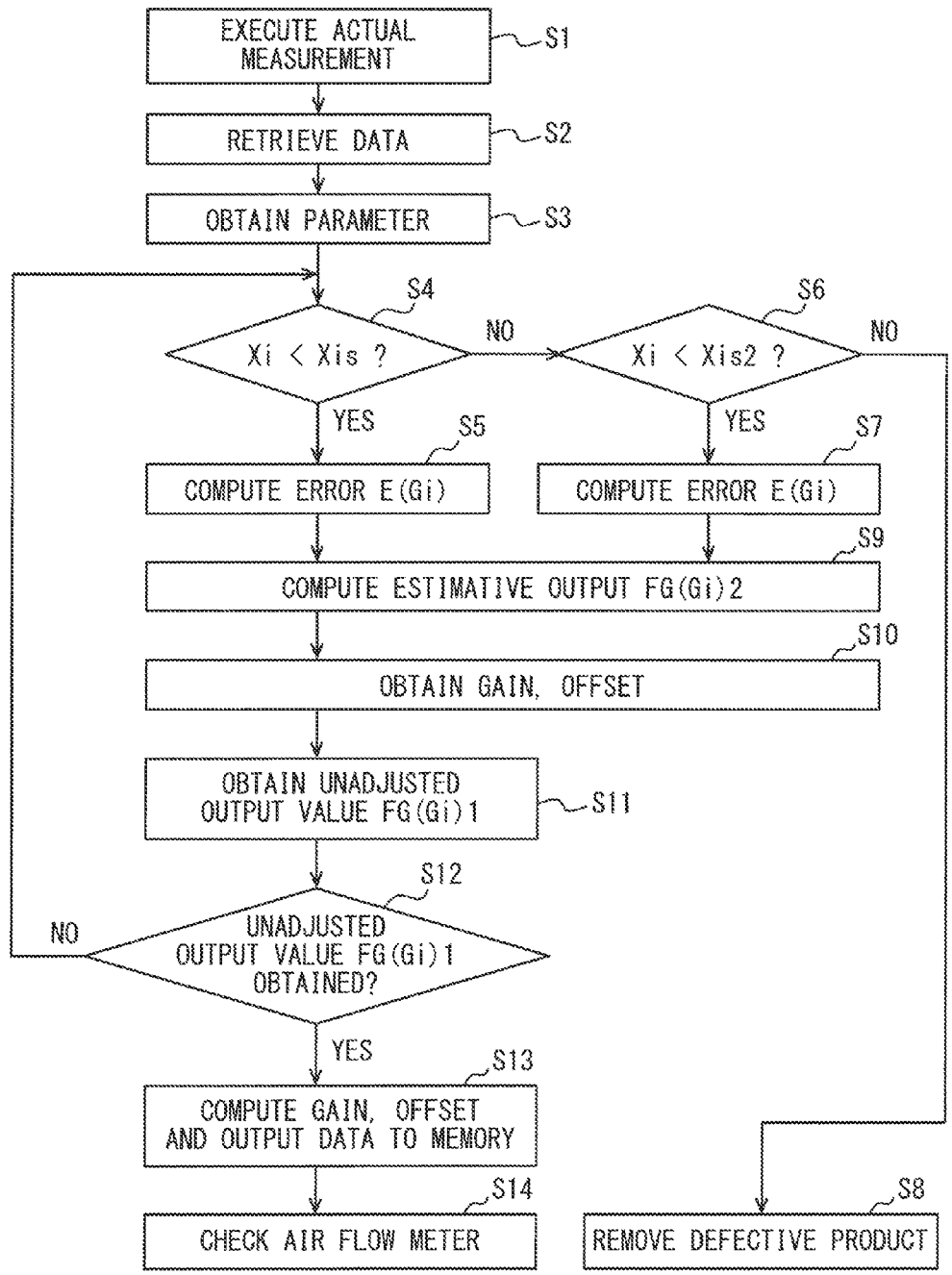

AIR FLOW RATE ADJUSTING APPARATUS

CROSS REFERENCE TO RELATED APPLICATION

This application is based on and incorporates herein by reference Japanese Patent Application No. 2013-124214 filed on Jun. 12, 2013.

TECHNICAL FIELD

The present disclosure relates to an air flow rate adjusting apparatus for an air flow meter.

BACKGROUND

For example, JP2010-281809A discloses an air flow meter that includes a sensor chip and a support plate. The sensor chip includes a sensor device formed in a thin wall portion of a substrate. The support plate supports the sensor chip. The sensor chip is installed in a recess of the support plate and forms a gap between the sensor chip and a wall of the recess to conduct air therethrough.

Therefore, in a case where a small amount of an assembly error (e.g., a gap dimension error of the gap formed between the sensor chip and the wall of the recess, or a tilt angle error of the sensor chip) occurs between the sensor chip and the support plate, an air flow rate of the air, which flows along a back surface of the thin wall portion having the sensor device, is changed, or the smooth flow of the air is disrupted. As a result, an output of the air flow meter relative to an air flow rate substantially deviates from a corresponding target value.

A digital multi-point adjusting technique (e.g., eight point or sixteen point adjusting technique) is known to adjust the output of the air flow meter to the corresponding target value.

Next, an example of previously proposed multi-point adjusting technique, which includes the following steps (i) to (iv), will be described.

(i) An air flow meter (hereinafter also referred to as a subject air flow meter), which is unadjusted, is installed to an apparatus that can change the air flow rate with a high accuracy.

(ii) An air flow rate, which corresponds to a corresponding one of adjustment points, is actually measured with the subject air flow meter. This step is repeated for all of the adjustment points.

(iii) Each adjacent two of the actual output values, which are outputted at the corresponding air flow rates (the adjustment points), respectively, are connected by a straight line, and unadjusted output characteristic is obtained through a linear approximation technique.

(iv) Adjustment data is obtained, and the obtained adjustment data is stored in an internal memory of the air flow meter. The adjustment data is data, which is used to adjust the output of the air flow meter to the target output (the target output characteristic, which is also referred to as adjusted ideal characteristic).

Here, an adjusting device, which adjusts the output of the air flow meter with the adjustment data stored in the internal memory, is provided in a sensor circuit (a control circuit) of the air flow meter. Therefore, when the above steps (i) to (iv) are performed, the output of the air flow meter can be adjusted to the target output (the target output characteristic).

However, in the previously proposed technique, the actual output value is obtained for all of the air flow rates, which are set at the adjustment points, respectively. Specifically, in the case of performing the eight point adjustment, the output of the air flow meter is measured for each of eight air flow rates. Also, in the case of performing the sixteen point adjustment, the output of the air flow meter is measured for each of sixteen air flow rates.

Therefore, the adjustment of one air flow meter takes a relatively long time. This will result in deterioration in the productivity of the air flow meter.

SUMMARY

The present disclosure addresses the above disadvantage. According to the present disclosure, there is provided an air flow rate adjusting apparatus for an air flow meter that measures a flow rate of air and includes a sensor chip, which has a sensor device installed in a thin wall portion to measure the flow rate of the air, and a support plate, which supports the sensor chip placed in the support plate and forms a gap between the sensor chip and the support plate to conduct the air through the gap. The air flow rate adjusting apparatus adjusts an output of the air flow meter based on an assembly dimension of the sensor chip relative to the support plate.

According to the present disclosure, there is also provided an air flow rate adjusting apparatus for an air flow meter that measures a flow rate of air and includes a sensor chip, which is inserted in a bypass flow path formed to conduct a portion of the air and has a sensor device installed in a thin wall portion to measure the flow rate of the air. The air flow rate adjusting apparatus adjusts an output of the air flow meter based on an assembly dimension of the sensor chip relative to an inner wall surface of the bypass flow path.

According to the present disclosure, there is also provided an air flow rate adjusting apparatus for an air flow meter that measures a flow rate of air and includes a sensor chip, which has a sensor device installed in a thin wall portion to measure the flow rate of the air. The air flow rate adjusting apparatus includes a controller. The controller estimates at least one estimated output of the air flow meter at at least one predetermined flow rate of the air based on: measured geometric data, which includes at least one of a dimension of a gap between the sensor chip and an adjacent wall, and an angle of the sensor chip relative to the adjacent wall; and at least two measured outputs of the air flow meter, which are measured at at least two different flow rates of the air that are different from the at least one predetermined flow rate of the air. The controller stores the at least one estimated output and the at least two measured outputs of the air flow meter and required adjustment data, which is required to adjust each of the at least one estimated output and the at least two measured outputs of the air flow meter to a corresponding target output of the air flow meter, in a memory of the air flow meter.

BRIEF DESCRIPTION OF THE DRAWINGS

The drawings described herein are for illustration purposes only and are not intended to limit the scope of the present disclosure in any way.

FIG. 3A is a partial side view showing a sensor chip, which has the sensor device and is installed in a support plate, according to the first embodiment;

FIG. 3B is a cross-sectional view taken along line IIIB-IIIB in FIG. 3A;

FIG. 3C is a cross-sectional view taken along line IIIC-IIIC in FIG. 3A;

FIG. 4 is a block diagram showing an air flow rate adjusting apparatus, an adjusting board and the air flow meter according to the first embodiment;

FIG. 7 is a flowchart showing the adjustment procedure of the first embodiment;

DETAILED DESCRIPTION

Figure 1:
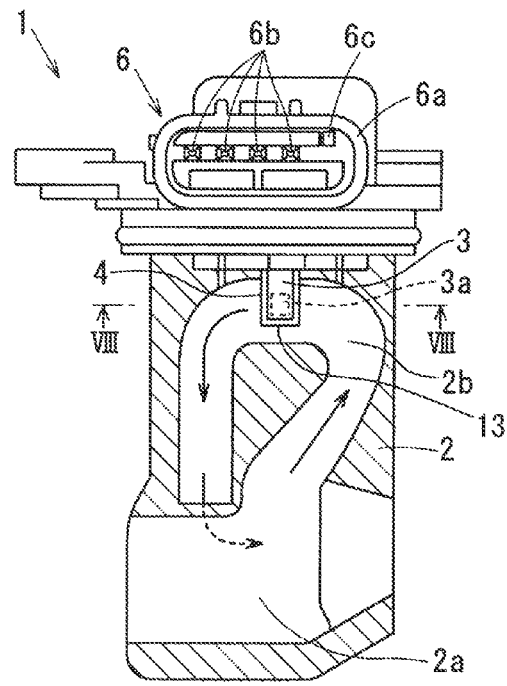
FIG. 1 is a cross-sectional view of an air flow meter according to a first embodiment of the present disclosure.

Embodiments of the present disclosure will be described with reference to the accompanying drawings.

The following embodiments are mere examples of the present disclosure, and the present disclosure is not limited to the following embodiments.

First Embodiment

A first embodiment of the present disclosure will be described with reference to FIGS. 1 to 7.

An example of an air flow meter 1, which is adjusted by an air flow rate adjusting apparatus 100 according to the present embodiment, will be described.

The air flow meter 1 is installed to an intake duct (e.g., an outlet duct of an air cleaner, or an intake pipe located on a downstream side of the air cleaner), which introduces intake air to an engine (i.e., an internal combustion engine) that generates a drive force for driving a vehicle.

The air flow meter 1 of the present embodiment is a compound sensor, which senses an air flow rate and a temperature of intake air drawn into the engine. The air flow meter 1 includes a resin housing (i.e., a passage forming member) 2, a sensor assembly 13, and a thermistor (not shown). The resin housing 2 is assembled to the intake duct. The sensor assembly 13 is installed in an inside of the resin housing 2 and senses the flow rate of the intake air. The thermistor is installed to an outside of the resin housing 2 and senses a temperature of the intake air.

Here, it should be noted that the air flow meter 1 is not limited to the one, which has the thermistor. In other words, the thermistor may be eliminated from the air flow meter 1, if desired.

The resin housing 2 is molded from a resin material and includes a bypass passage 2a and a sub-bypass passage 2b. A part of the intake air, which flows through the intake duct, passes through the bypass passage 2a. Furthermore, a part of the intake air, which flows in the bypass passage 2a, flows through the sub-bypass passage 2b. In the present embodiment, the bypass passage 2a and the sub-bypass passage 2b serve as a bypass flow path.

The sensor assembly 13 has a sensor sub-assembly 13a. The sensor sub-assembly 13a includes a sensor chip 3 and a support plate 4. The sensor chip 3 is of a thermal type and has a sensor device 3a that measures the air flow rate and is placed in a thin wall portion (membrane portion) 40a of a semiconductor substrate 40 (e.g., a silicon substrate) configured into a planar plate form. The support plate 4 supports the sensor chip 3. The sensor chip 3, which is supported by the support plate 4, is installed in the sub-bypass passage 2b. A wall 4w of the support plate 4 may serve as an adjacent wall of the present disclosure, which is adjacent to the sensor chip 3.

The sensor chip 3 is placed in an inside of a recess 4a, which is formed in the support plate 4. As shown in FIGS. 3A to 3C, a gap 50, which enables flow of the air therethrough, is formed between the sensor chip 3 and the recess 4a.

Specifically, the sensor chip 3 has a cavity (a recess) 40b, which is formed by partially removing a back surface of the semiconductor substrate 40. The sensor device 3a is formed in the thin wall portion 40a, which is placed above the cavity 40b in FIG. 3B. The sensor device 3a includes temperature sensing resistor elements to measure the flow rate of the air.

One longitudinal end portion of the planar sensor chip 3 (more specifically, one longitudinal end portion of the substrate 40) is fixed to the support plate 4. In the installed state where the sensor chip 3 is installed to the support plate 4, a top surface of the sensor chip 3 (more specifically, a top surface 40c of the substrate 40) is generally flush with a top surface 4b of the support plate 4, and the gap 50 is formed between a back surface 40d of the sensor chip 3 (more specifically, the semiconductor substrate 40) and a bottom surface 4a1 of the recess 4a to conduct the air flow (specifically, the air flow that flows along the back surface of the thin wall portion 40a) through the gap 50.

The sensor assembly 13 further includes a sensor circuit 5. The sensor circuit 5 corrects the measured air flow rate, which is measured with the sensor device 3a. Thereafter, the sensor circuit 5 outputs a measurement signal, which indicates the corrected air flow rate, after frequency modulation of the measurement signal. The sensor circuit 5 is molded with a resin material (primary molding resin).

The sensor circuit 5 is electrically connected with an engine control unit (ECU) through a connector 6 that is formed in the resin housing 2. The ECU is installed in the vehicle at a location that is different from the location of the air flow meter 1.

Specifically, the connector 6 includes a coupler 6a made of a resin material and a plurality of terminals 6b arranged in the coupler 6a.

Now, a specific example of the connector 6 will be described with reference to FIG. 1. Here, it should be noted that the connector 6 shown in FIG. 1 is a mere example, and the connector of the present disclosure is not limited to the connector 6 shown in FIG. 1. The connector 6 of FIG. 1 is a male connector and includes the coupler 6a and the terminals (e.g., a power source terminal, a ground terminal, a flow rate output terminal, and a temperature output terminal in this embodiment) 6b. The coupler 6a is formed as a female coupler. The terminals 6b project from a bottom surface of the coupler 6a into an inside space of the coupler 6a.

An output adjustment terminal 6c is exposed at a deep location in the inside space of the coupler 6a.

The sensor circuit 5 digitizes the output of the sensor device 3a into a digital signal and corrects the digital signal. Thereafter, the sensor circuit 5 executes frequency modulation of the corrected digital signal and outputs the frequency modulated digital signal to the ECU.

Figure 2:
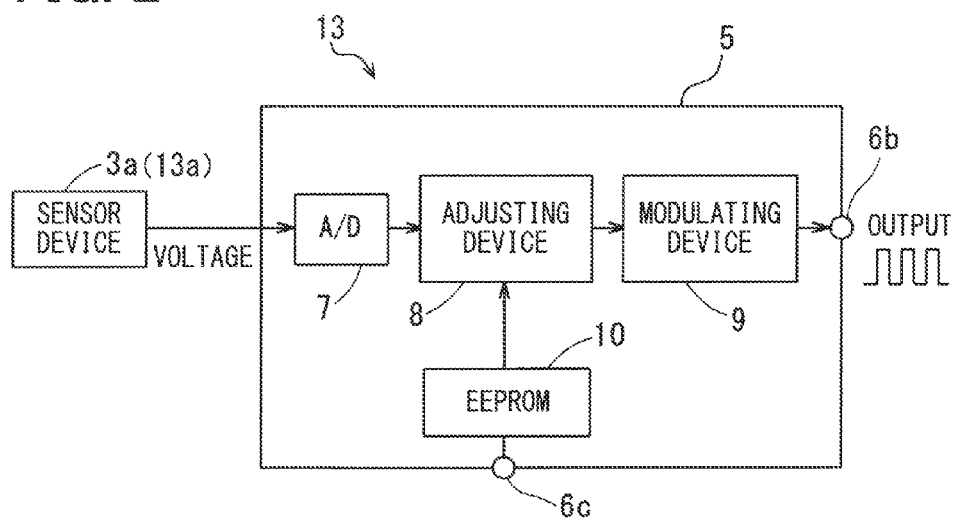
FIG. 2 is a diagram showing a sensor device and a sensor circuit of the air flow meter of the first embodiment.

Specifically, as shown in FIG. 2, the sensor circuit 5 includes an A/D converter 7, a digital adjusting device (digital adjusting means) 8, a frequency modulating device (frequency modulating means) 9, and an internal memory (e.g., an electrically erasable, programmable read-only memory abbreviated as EEPROM) 10. The A/D converter 7 digitizes the voltage signal (analog signal) of the sensor device 3a, i.e., converts the voltage signal of the sensor device 3a into a corresponding digital signal. The digital adjusting device 8 adjusts the sensed digital value (the digital output before adjustment thereof) of the sensor device 3a. The frequency modulating device 9 executes the frequency modulation of the adjusted output, which is adjusted at the digital adjusting device 8. The internal memory 10 stores various data. Here, it should be noted that the internal memory 10 is not limited to the EEPROM, and any other type of memory (e.g., another type of non-volatile memory or storage, or a RAM) may be used as the internal memory 10, if desired.

Next, the adjustment technique of the air flow meter 1 will be described.

The output of the air flow meter 1 is adjusted by the air flow rate adjusting apparatus 100. FIG. 4 shows the air flow rate adjusting apparatus 100 connected to the connector 6 of the air flow meter 1 in order to execute the adjustment of the air flow meter 1. In FIG. 4, with respect to the air flow meter 1, only the internal memory 10 of the air flow meter 1 is shown for the sake of simplicity. The air flow rate adjusting apparatus 100 may be implemented by a computer (e.g., a general computer), which includes a monitor (not shown), a central processing unit (CPU) 100a, and a storage device (also referred to as a storage arrangement) 100b. The CPU 100a may serve as a controller of the present disclosure. Furthermore, the controller of the present disclosure may include only one CPU or alternatively more than one CPU, i.e., a plurality of CPUs to execute the required functions. The storage device 100b may include one or more memories (e.g., a RAM, a ROM) and/or a hard disk. The storage device 100b may store required data and a dedicated computer program, which executes the corresponding functions of the air flow rate adjusting apparatus 100. The air flow rate adjusting apparatus 100 may be connected to the air flow meter 1 through an adjusting board 110, which serves as an interface device that interfaces between the air flow rate adjusting apparatus 100 and the air flow meter 1 (more specifically, the connector 6).

In some cases, the air flow rate adjusting apparatus 100 shown in FIG. 4 may include the adjusting board 110 to eliminate a need for providing the separate adjusting board 110. Furthermore, although the computer is used as the air flow rate adjusting apparatus 100 in the present embodiment, the air flow rate adjusting apparatus 100 of the present disclosure may be implemented by a dedicated apparatus, which includes the controller and the storage device and is dedicated to implement the functions of the air flow rate adjusting apparatus 100 discussed below. In such a case, the dedicated air flow rate adjusting apparatus may include an interface device configured to connect with the connector 6 of the air flow meter 1, so that the adjusting board 110 may be eliminated.

The air flow rate adjusting apparatus 100 stores, i.e., writes adjustment data, which is used to adjust the output(s) of the air flow meter 1 to a target value (also referred to as a target output characteristic α), in the internal memory 10 of the air flow meter 1. The adjustment data, which is formed by the air flow rate adjusting apparatus 100, is written, i.e., stored in the internal memory 10 through the adjustment terminal 6c.

The air flow rate adjusting apparatus 100 adjusts the output of the air flow meter 1 to the corresponding target value (the target output characteristic α) through use of a digital multi-point adjusting technique with reference to a measured assembly dimension(s) of the sensor chip 3 relative to the support plate 4 (also referred to as measured geometric data).

In the present embodiment, a dimension (hereinafter also referred to as a gap dimension) $X_i$ of the gap 50 formed between the back surface 40d of the sensor chip 3 and the bottom surface 4a1 of the recess 4a is used as a specific example of the assembly dimension (the measured geometric data).

Although a measurement method for measuring the gap dimension $X_i$ is not limited to any particular one, a laser measurement device, which uses a laser light, is used as a specific example in this embodiment. Since a thickness of the sensor chip 3 and a depth of the recess 4a are known, the gap dimension $X_i$ is obtained based on a positional difference between the surface 4b of the support plate 4 and the surface 40c of the sensor chip 3 (more specifically, the semiconductor substrate 40) through use of the laser measurement device.

The measured assembly dimension(s) is stored in the internal memory 10. Specifically, in the present embodiment, the gap dimension $X_i$ between the back surface 40d of the sensor chip 3 and the bottom surface 4a1 of the recess 4a is stored in the internal memory 10.

In the present embodiment, the gap dimension $X_i$ between the back surface 40d of the sensor chip 3 and the bottom surface 4a1 of the recess 4a is used as the assembly dimension. However, the assembly dimension is not limited to this one.

The assembly dimension may be one of other dimensions. Specifically, as shown in FIG. 3B, these assembly dimensions may include, for example, a lateral tilt angle (also referred to as a first tilt angle) $\theta_1$ of the sensor chip 3 relative to the support plate 4 in a flow direction of the intake air, a longitudinal tilt angle (also referred to as a second tilt angle) $\theta_2$ of the sensor chip 3 relative to the support plate 4 in a longitudinal direction of the sensor chip 3, first and second lateral gap dimensions L1, L2, each of which is measured between a corresponding side surface of the sensor chip 3 and a corresponding side surface of the recess 4a of the support plate 4, and a distal end gap dimension L3 between a distal end surface of the sensor chip 3 and a corresponding opposed side surface of the recess 4a of the support plate 4.

Alternatively, two or more of the above discussed dimensions (the measured geometric data) $X_i$, $\theta_1$, $\theta_2$, L1-L3 may be used to adjust the output(s) of the air flow meter 1.

Figure 5:
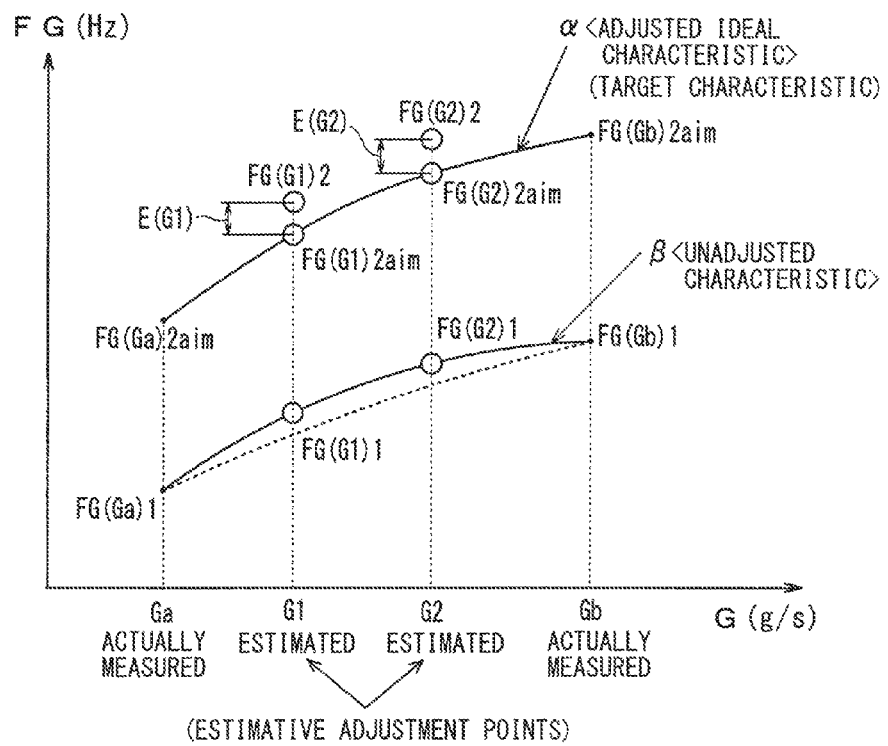
FIG. 5 is a diagram for describing an adjustment procedure according to the first embodiment.

An adjusting procedure, which includes first to fourth processes, executed by the air flow rate adjusting apparatus 100 (more specifically the CPU 100a of the air flow rate adjusting apparatus 100) will be described with reference to FIG. 5. In the following discussion, in order to ease understanding, two estimation points $G_i$ (here, i stands for a positive number, such as 1, 2, indicating the corresponding estimation point number) are used as examples. However, the total number of the estimation points $G_i$ is not limited to two and may be changed to any other appropriate number (e.g., any number larger than two). Furthermore, it should be noted that each estimation point $G_i$ is a flow rate (also referred to as an unmeasured flow rate or a predetermined flow rate), at which the output (also referred to as an estimated output or an unadjusted output) of the air flow meter 1 is estimated. Therefore, in the following discussion, Gi (more specifically, G1, G2 discussed below in detail) may be referred to as the estimation point or the unmeasured flow rate (or simply referred to as the flow rate).

(First Process)

First of all, a flow rate error (also referred to as an output error) E(Gi) at each estimation point Gi is estimated based on the gap dimension Xi.

Specifically, a flow rate error E(G1) at a flow rate (estimation point) G1 and a flow rate error E(G2) at a flow rate (estimation point) G2 are obtained in this embodiment.

Here, in the air flow rate adjusting apparatus 100 of the present embodiment, an estimation equation is used as a technique of obtaining the flow rate error E(Gi) based on the gap dimension Xi.

The estimation equation is independently set for each estimation point Gi.

Figure 6:
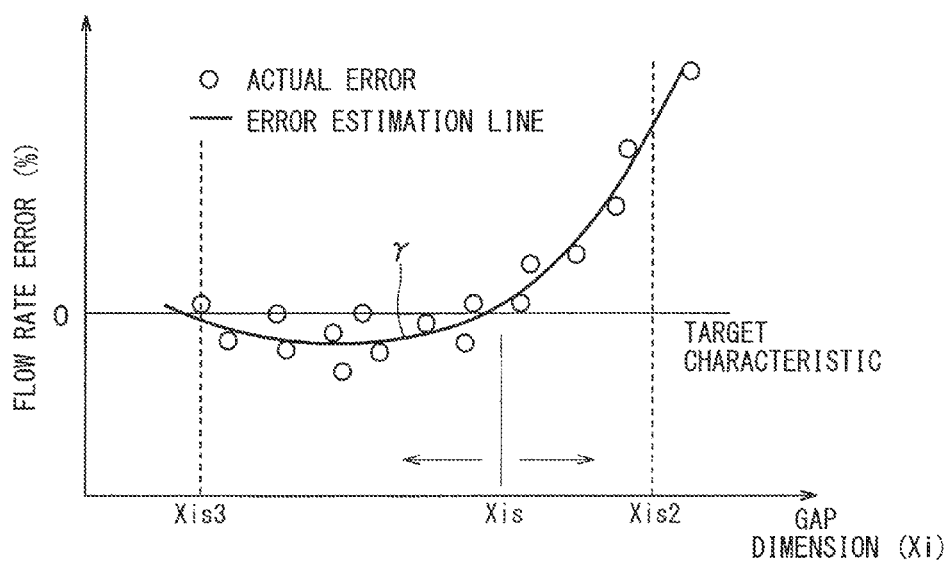
FIG. 6 is a diagram showing a relationship between a gap dimension and a flow rate error according to the first embodiment.

The estimation equation, which is set for each corresponding estimation point Gi, forms an error estimation line γ (correlation approximation line), which is obtained based on actual errors (indicated by blank circles in FIG. 6). The estimation equation is obtained through a least square method, and/or a simple/multiple regression analysis.

When every flow rate error E(Gi) is estimated with only one estimation equation based on the gap dimension Xi, an estimation error becomes large. Therefore, in the present embodiment, the estimation equation, which is used to obtain the flow rate error E(Gi), is changed, i.e., switched based on a size of the gap dimension Xi.

For instance, as shown in FIG. 6, in a case where the gap dimension Xi is smaller than a predetermined value Xis, an estimation equation (linear estimation equation) of, for example, a multivariable polynomial equation may be used as the estimation equation. In contrast, in a case where the gap dimension Xi is larger than the predetermined value Xis, an estimation equation (non-linear estimation equation) of, for example, a single/multiple variable exponential equation may be used as the estimation equation. Here, it should be noted that the predetermined value Xis is set for each flow rate Gi. That is, in the case of the flow rate G1, a predetermined value X1s is used as the predetermined value Xis. Furthermore, in the case of the flow rate G2, a predetermined value X2s, which may be different from the predetermined value Xis, is used as the predetermined value Xis.

(Second Process)

Each of the estimative outputs FG(Gi)2 (here, i stands for the positive number as discussed above) relative to the corresponding target output FG(Gi)2aim (target output characteristic α) is obtained based on the flow rate error E(Gi) of the corresponding estimation point Gi, which is obtained in the first process.

Specifically, an estimative output FG(G1)2 at the flow rate G1 is obtained based on the flow rate error E(G1), which is obtained in the first process. Also, an estimative output FG(G2)2 at the flow rate G2 is obtained based on the flow rate error E(G2).

(Third Process)

In the third process, reference air flow rates are measured at two or more points, respectively, with the subject air flow meter (unadjusted air flow meter) 1. Then, unadjusted outputs of the air flow meter 1 at the corresponding estimation points Gi (unadjusted outputs FG(Gi)1 at the estimation points Gi) are estimated (using inverse transformation).

Specifically, an actual output value FG(Ga)1 at a low flow rate Ga and an actual output value FG(Gb)1 at a high flow rate Gb are measured with the subject air flow meter 1. Then, the unadjusted output FG(G1)1 at the flow rate G1 is obtained based on the estimative output FG(G1)2, which is obtained in the second process, in view of the actual output values FG(Ga)1, FG(Gb)1. Also, the unadjusted output FG(G2)1 at the flow rate G2 is obtained based on the estimative output FG(G2)2, which is obtained in the second process, in view of the actual output values FG(Ga)1, FG(Gb)1.

As discussed above, in the third process, the four unadjusted outputs FG(Ga)1, FG(G1)1, FG(G2)1, FG(Gb)1, which correspond to the four flow rates Ga, G1, G2, Gb at the four points, are obtained. In other words, the unadjusted outputs FG(Gi)1, which respectively correspond to the estimation points Gi, are obtained (estimated) in the third process.

(Fourth Process)

The unadjusted output characteristic β (data that forms a characteristic line indicated by β in FIG. 5) is obtained based on the unadjusted outputs FG(Ga)1, FG(G1)1, FG(G2)1, FG(Gb)1 of the adjustment points (four points), which are obtained in the third process. Then, the adjustment data, which is used to adjust the unadjusted output characteristic β to the target output characteristic, i.e., adjusted ideal output characteristic α (data that forms a characteristic line indicated by α in FIG. 5), is formed.

Specifically, each adjacent two of the unadjusted outputs FG(Ga)1, FG(G1)1, FG(G2)1, FG(Gb)1 may be connected by a corresponding straight line to obtain the unadjusted output characteristic β through a linear approximation technique. Furthermore, the adjustment data, which is used to adjust the unadjusted outputs FG(Ga)1, FG(G1)1, FG(G2)1, FG(Gb)1 to the target outputs FG(Ga)2aim, FG(G1)2aim, FG(G2)2aim, FG(Gb)2aim, respectively, is formed.

Thereafter, the adjustment data, which is required to adjust the unadjusted output characteristic β (e.g., the unadjusted output FG(Ga)1, FG(G1)1, FG(G2)1, FG(Gb)1 along the characteristic line indicated by β) to the target output characteristic α (e.g., the target output FG(Ga)2aim, FG(G1)2aim, FG(G2)2aim, FG(Gb)2aim along the characteristic line indicated by α), is stored in the internal memory 10 of the air flow meter 1.

When the above-described fourth process is completed, the adjustment of the air flow meter 1 is completed. The output adjustment of the air flow meter 1 may be performed on the air flow meter 1 in a state where the air flow meter 1 is not yet assembled to the installation subject component (e.g., the air cleaner). Alternatively, the adjustment of the air flow meter 1 may be performed on the air flow meter 1 in the state where the air flow meter 1 is assembled to the installation subject component (e.g., the air cleaner).

Now, a specific example of the adjustment procedure executed by the air flow rate adjusting apparatus 100 (more specifically, the CPU 100a) discussed above will be described with reference to a flowchart of FIG. 7.

At step S1, the actual outputs of the air flow meter 1 before the execution of the adjustment are measured. Specifically, the actual output value FG(Ga)1 at the low flow rate Ga and the actual output value FG(Gb)1 at the high flow rate Gb are measured.

Thereafter, at step S2, the required data, which is stored in the internal memory 10 of the subject air flow meter 1, is retrieved from the internal memory 10.

At step S3, the parameter (the gap dimension Xi), which is used to estimate the flow rate error E(Gi), is obtained from the retrieved data.

At step S4, it is determined whether the gap dimension Xi, which is obtained at step S3, is smaller than the predetermined value Xis, which is used as the reference value for changing, i.e., switching the estimation equation.

When the answer to the inquiry at step S4 is YES, the operation proceeds to step S5. At step S5, the flow rate error E(Gi) at the predetermined estimation point Gi is estimated with the linear estimation equation based on the gap dimension Xi. For instance, at step S5, the flow rate error E(Gi) may be computed with the following equation, in which axi represents a corresponding coefficient.

$$E(Gi)=axi*Xi$$

Here, it should be noted that the equation of step S5 is not limited to the above equation, and the above equation may be modified or changed to any other appropriate equation, if desired.

Furthermore, in the present instance, only the gap dimension Xi is used as the assembly dimension (geometric data). However, any one or more of the other dimensions L1, L2, L3, θ1, θ2 may be additionally used to compute the flow rate error E(Gi) with a corresponding linear equation at step S4. In such a case, a flow rate error may be computed for each of the one or more of the other dimensions L1, L2, L3, θ1, θ2 with the equation similar to the above equation while using a corresponding coefficient that is set for each of the one or more of the other dimensions L1, L2, L3, θ1, θ2. Then, a sum of the computed flow rate errors may be computed as the flow rate error E(Gi).

When the answer to the inquiry at step S4 is NO, the operation proceeds to step S6. At step S6, it is determined whether the obtained gap dimension Xi is smaller than a predetermined dimension (upper threshold dimension) Xis2.

When the answer to the inquiry at step S6 is YES, the operation proceeds to step S7. At step S7, the flow rate error E(Gi) at the predetermined estimation point Gi is estimated with the non-linear estimation equation based on the gap dimension Xi. For instance, at step S7, the flow rate error E(Gi) may be computed with the following exponential equation (non-linear equation), in which ai0, axi1, axi2, axi3, axi4 and axi5 represent corresponding coefficients.

$$E(Gi)=ai0+(axi1*Xi)+(axi2*Xi^2)+(axi3*Xi^3)+(axi4*Xi^4)+(axi5*Xi^5)$$

Here, it should be noted that the exponential equation of step S7 is not limited to the above equation, and the above equation may be modified or changed to any other equation. For instance, in the above equation, up to the power of five is used. This may be changed to any other power (e.g., up to power of two, three, four or more than five).

Furthermore, although the above exponential equation is used only at step S7 in this instance, the above exponential equation may be also used at step S4 by appropriately changing the values of the coefficients ai0, axi1, axi2, axi3, axi4 and axi5. For instance, in the case of step S7 where the condition of Xi<Xis2 is satisfied, the coefficients ai0, axi1, axi2, axi3, axi4 and axi5 may be set to a first set of values, respectively, which are determined through, for example, experiments and/or simulations. In contrast, in the case of step S4 where the condition Xi<Xis is satisfied, the coefficients ai0, axi1, axi2, axi3, axi4 and axi5 may be set to a second set of values, respectively, which are determined through, for example, experiments and/or simulations.

Furthermore, similar to the above-discussion of step S4, any one or more of the other dimensions L1, L2, L3, θ1, θ2 may be additionally used to compute the flow rate error E(Gi) with a corresponding equation at step S7. In such a case, a flow rate error may be computed for each of the one or more of the other dimensions L1, L2, L3, θ1, θ2 with the exponential equation similar to the above exponential equation discussed above while using corresponding coefficients that are set for each of the one or more of the other dimensions L1, L2, L3, θ1, θ2. Then, a sum of the computed flow rate errors may be computed as the flow rate error E(Gi) at step S7.

When the answer to the inquiry at step S6 is NO, the operation proceeds to step S8. At step S8, since the gap dimension Xi is larger than the standard, the subject air flow meter 1 is determined as a defective product and is removed from the production line.

At step S9, the estimative output FG(Gi)2 relative to the target output FG(Gi)2aim (the target output characteristic α) is obtained based on the flow rate error E(Gi), which is obtained at step S5 or step S7. For example, the estimative output FG(Gi)2 may be computed with the following equation, in which KGi represents a conversion coefficient.

$$FG(Gi)2=FG(Gi)2aim*(1+E(Gi)/KGi/100)$$

Here, it should be noted that the equation of step S9 is not limited to the above equation, and the above equation may be modified or changed to any other equation.

At step S10, there are obtained a gain and an offset, which are used to estimate (inverse transform) the unadjusted output FG(Gi)1 at the estimation point Gi based on the measured outputs FG(Ga)1, FG(Gb)1 at the two points (Ga, Gb), which are located on the smaller flow rate side and the larger flow rate side of the estimation point Gi. Here, the gain may be computed with the following equation.

$$\text{Gain}=(FG(Gb)1-FG(Ga)1)/(FG(Gb)2aim-FG(Ga)2aim)$$

Also, the offset may be computed with the following equation.

$$\text{Offset}=FG(Ga)1-\text{Gain}*FG(Ga)2aim$$

Alternative to the above equation, the offset may be computed with the following equation.

$$\text{Offset}=FG(Gb)1-\text{Gain}*FG(Gb)2aim$$

Here, it should be noted that the equations of step S10 are not limited to the above equations, and the above equations may be modified or changed to any other equations.

At step S11, the unadjusted output FG(Gi)1 at the estimation point Gi is obtained based on the estimative output FG(Gi)2, which is obtained at step S9, and the gain and the offset, which are obtained at step S10.

At step S12, it is determined whether the unadjusted output FG(Gi)1 at every one of the estimation points Gi is obtained. When the answer to the inquiry at step S12 is NO, the operation returns to step S4 to compute the other unadjusted output FG(Gi)1 at the remaining estimation point(s) Gi.

When the answer to the inquiry at step S12 is YES, the operation proceeds to step S13. At step S13, the unadjusted output characteristic β is obtained based on the unadjusted output FG(Gi)1 at every one of the adjustment points, and the adjustment data (e.g., each corresponding gain and each corresponding offset), which is used to adjust the unadjusted output characteristic β to the target output characteristic α (adjusted ideal output characteristic), is formed. Thereafter, the formed adjustment data is stored in the internal memory 10 of the air flow meter 1.

In this embodiment, the data, which is outputted from the air flow rate adjusting apparatus 100 to the internal memory 10 of the air flow meter 1 at step S13, may include the four unadjusted outputs FG(Ga)1, FG(G1)1, FG(G2)1, FG(Gb)1 and three sets of gains and offsets (specifically, the gain and offset between the flow rate Ga and the flow rate G1, the gain and offset between the flow rate G1 and the flow rate G2, and the gain and offset between the flow rate G2 and the flow rate Gb). Alternatively, the data to be stored in the internal memory 10 of the air flow meter 1 may include the four unadjusted outputs FG(Ga)1, FG(G1)1, FG(G2)1, FG(Gb)1 and the four target outputs FG(Ga)2aim, FG(G1)2aim, FG(G2)2aim, FG(Gb)2aim. With the above-discussed data stored in the internal memory 10 of the air flow meter 1, the unadjusted output (e.g., each of unadjusted outputs FG(Ga) 1, FG(G1)1, FG(G2)1, FG(Gb)1 and other unadjusted outputs) of the air flow meter 1 may be adjusted to its corresponding target output of the air flow meter 1 after installation of the air flow meter 1 in the intake duct. Furthermore, the adjustment data may be not limited to the above discussed one. That is, as long as it is possible to adjust each of the unadjusted outputs to the corresponding target output, any other type of adjustment data may be used.

At step S14, the air flow meter 1, for which the adjustment is completed, is checked (inspected). Specifically, the air flow at a standard flow rate is passed through the adjusted air flow meter 1, and the output value is checked to see whether the standard output is obtained.

First Advantage of Embodiment

As discussed above, the air flow rate adjusting apparatus 100 of the present embodiment adjusts the output of the air flow meter 1 based on the assembly dimension (the gap dimension Xi of the embodiment discussed above) of the sensor chip 3 relative to the support plate 4.

Therefore, at the time of performing the multi-point adjustment, it is not necessary to obtain the actual output value, which corresponds to the corresponding air flow rate, at all of the estimation points Gi. Specifically, in this embodiment, the actual output values are measured only at the two points, and the output values at the two estimation points Gi are computed based on the assembly dimension (the gap dimension Xi). Therefore, the adjustment time period, which is required to adjust the output characteristic of the air flow meter 1 using the multi-point adjustment technique, can be shortened, and the productivity of the air flow meter 1 can be improved. Furthermore, the number of the measurement flow rates (the number of measurements of the actual output values) can be reduced, so that the costs at the manufacturing facility can be reduced.

Second Advantage of Embodiment

As discussed above, the air flow rate adjusting apparatus 100 of the present embodiment uses the gap dimension Xi between the back surface 40d of the sensor chip 3 and the bottom surface 4a1 of the recess 4a as the example of the assembly dimension.

The gap dimension Xi has the significant influence on the output characteristic variations or the output characteristic change particularly in the high flow rate range. Therefore, when the gap dimension Xi is used, the air flow meter 1 can be adjusted with the high accuracy throughout the wide range, which includes the low flow rate range, the middle flow rate range and even the high flow rate range.

Third Advantage of Embodiment

In the case where the output of the air flow meter 1 is adjusted based on the multiple assembly dimensions, it is possible to reduce the amount of variation in the estimation error E(Gi) at the estimation point Gi throughout the wide range, which is from the low flow rate to the high flow rate. As a result, the measurement accuracy of the air flow meter 1 can be increased.

Fourth Advantage of Embodiment

As discussed above, the air flow rate adjusting apparatus 100 of the present embodiment changes, i.e., switches the estimation equation, which is used to obtain the flow rate error E(Gi) based on the assembly dimension (the gap dimension Xi in the above embodiment).

When the multiple estimation equations (e.g., the linear estimation equation, the non-linear estimation equation in the above embodiment) are used in the manner discussed above, the computation error of the flow rate error E(Gi) relative to the assembly dimension (the gap dimension Xi) can be reduced, and thereby the measurement accuracy of the air flow meter 1 can be improved.

Fifth Advantage of Embodiment

As discussed above, the air flow rate adjusting apparatus 100 of the present embodiment actually measures the two or more reference air flow rates (the low flow rate Ga and the high flow rate Gb) with the subject air flow meter 1, and the unadjusted output FG(Gi)1 of the subject air flow meter 1 at each unmeasured flow rate (each estimation point) Gi is estimated based on the measured actual output value FG(Ga) 1, FG(Gb)1 of the subject air flow meter 1 at each of the reference air flow rates (the low flow rate Ga and the high flow rate Gb), the target output FG(Ga)2aim, FG(Gb)2aim at each of the two or more reference air flow rates (the low flow rate Ga and the high flow rate Gb), and the corresponding target output FG(Gi)2 at the unmeasured flow rate (the estimation point) Gi, as discussed with reference to steps S9 to S11.

Since each unadjusted output FG(Gi)1, which corresponds to the corresponding estimation point Gi, is obtained based on the actual outputs of the subject air flow meter 1, which are obtained through the actual measurements with the subject air flow meter 1, the adjusted output characteristic can be substantially approximated to the target output characteristic α, that is, the adjusted output can be substantially approximated to the target output. In other words, the measurement accuracy of the air flow meter 1 can be improved.

Sixth Advantage of Embodiment

In the present embodiment, the assembly dimension (the gap dimension Xi in the present embodiment), which is used for the adjustment, is initially stored in the internal memory 10 of the subject air flow meter 1, and the air flow rate adjusting apparatus 100 retrieves this assembly dimension from the internal memory 10 to execute the above-discussed adjusting procedure of this air flow meter 1.

Therefore, it is possible to always have the correct relationship between the assembly dimension (the gap dimension Xi), which is used for the adjustment, and the subject air flow meter 1, which needs to be adjusted.

Seventh Advantage of Embodiment

As discussed above, in the case of the air flow rate adjusting apparatus 100 of the present embodiment, when the assembly dimension is larger than the predetermined dimension (the gap dimension Xi being larger than the predetermined dimension Xis2), the air flow meter 1 of the measurement subject is determined as the defective product.

In this way, the defective air flow meter 1, which cannot be adjusted due to the large output characteristic deviation, can be removed from the production line at the early stage. More specifically, when the gap dimension Xi becomes larger than the predetermined dimension Xis2, a change in the flow rate error E(Gi) becomes large. Therefore, in such a case, it is difficult to obtain the correct flow rate error E(Gi).

Additionally, when the assembly dimension is smaller than another predetermined dimension (lower threshold dimension) Xis3 shown in FIG. 6, the subject air flow meter 1 may be determined as the defective product. For instance, in the case where the gap dimension Xi is smaller than the predetermined dimension Xis3, when vibrations are generated from, for example, the vehicle, the sensor chip 3 may possibly collide against the support plate 4 to cause a damage of the sensor chip 3. Also, in the case where the gap dimension Xi is smaller than the predetermined dimension Xis3, a foreign object, such as debris, may be caught between the sensor chip 3 and the support plate 4 in the gap 50 to hinder the air flow through the gap 50. Therefore, the use of the predetermined dimension Xis3 can avoid these disadvantages.

Second Embodiment

In a second embodiment of the present disclosure, the components, which are similar to those discussed in the first embodiment, will be indicated by the same reference numerals and will not be described redundantly for the sake of simplicity.

The air flow meter 1 of the second embodiment is similar to the air flow meter 1 of the first embodiment, and the sensor chip 3 of the second embodiment is installed in the sub-bypass passage 2b (the example of the bypass flow path).

Figure 8A:
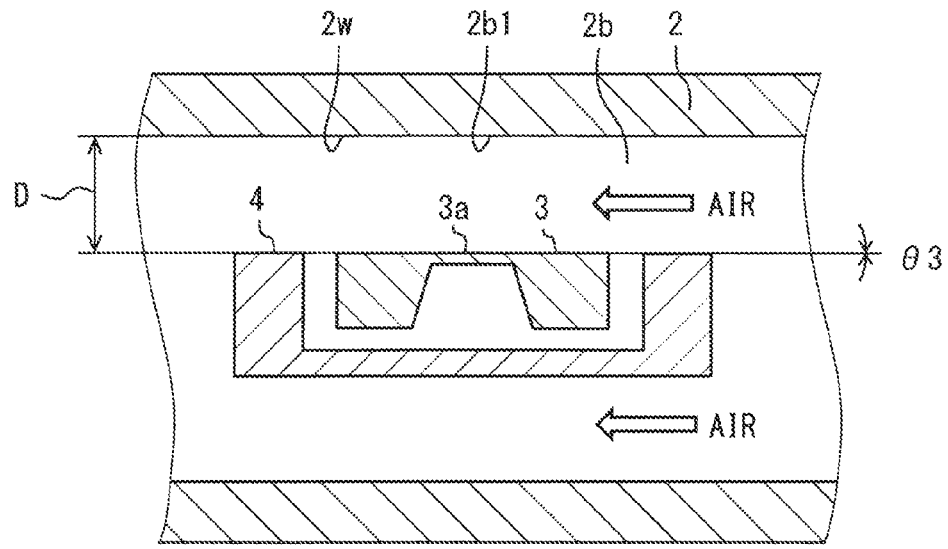
FIG. 8A is a schematic cross-sectional view taken along line VIII-VIII in FIG. 1, showing an air flow meter installed in a sub-bypass passage according to a second embodiment of the present disclosure.

In the case of the air flow rate adjusting apparatus 100 of the second embodiment, with reference to FIG. 8A, an assembly dimension (measured geometric data) of the sensor chip 3 relative to an inner wall surface 2b1 of a wall 2w of the sub-bypass passage 2b (the bypass flow path) is measured. Specifically, the assembly dimension may include a dimension (also referred to as a gap dimension) D of a gap between the sensor chip 3 and the inner wall surface 2b1 of the sub-bypass passage 2b or a tilt angle θ3 of the sensor chip 3 relative to the sub-bypass passage 2b, more specifically the inner wall surface 2b1 of the sub-bypass passage 2b or an imaginary plane that is parallel to the inner wall surface 2b1. The tilt angle θ3 of the sensor chip 3 may be alternatively measured relative to a flow direction of the air (see an arrow in FIG. 8A) in the sub-bypass passage 2b. The wall 2w of the sub-bypass passage 2b may serve as an adjacent wall of the present disclosure, which is adjacent to the sensor chip 3. The output of the air flow meter 1 is adjusted based on the measured assembly dimension (the measured geometric data) discussed above.

With the above construction, the measurement accuracy of the air flow meter 1 may be improved. Here, it should be noted that both of the above assembly dimensions (i.e., the gap dimension D and the tilt angle θ3) may be used to obtain the flow rate error E(Gi) at each estimation point Gi in a manner similar to the one discussed in the first embodiment. Additionally, one or more of the above assembly dimensions (i.e., the gap dimension D and the tilt angle θ3) may be used along with any one or more of the assembly dimensions Xi, θ1, θ2, L1-L3 of the first embodiment to obtain the flow rate error E(Gi) at each estimation point Gi.

Figure 8B:
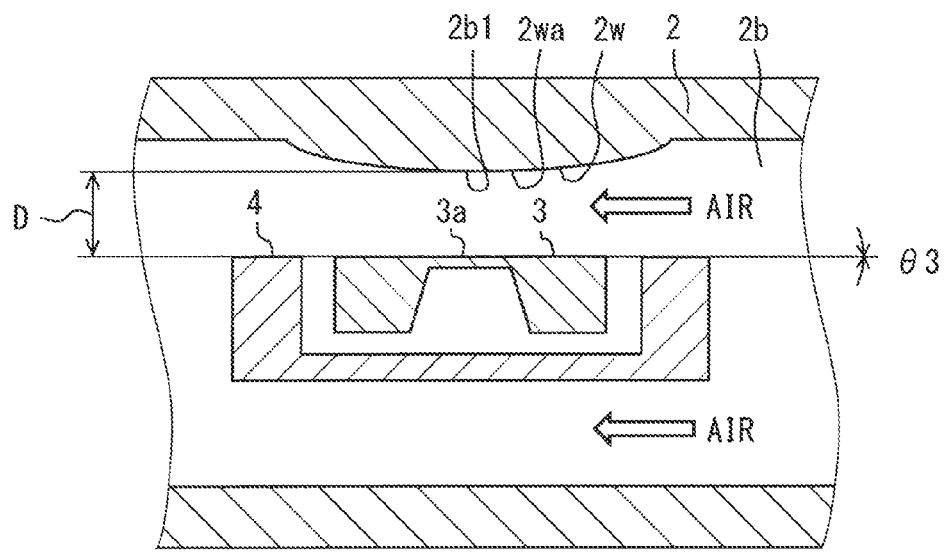
FIG. 8B is a schematic cross-sectional view, showing a modification of the second embodiment.

Alternative to the structure of FIG. 8A, the sensor chip 3 may be placed in a different type of sub-bypass passage 2b. Specifically, as shown in FIG. 8B, which shows a modification of FIG. 8A, a bulge 2wa may be formed in the wall 2w in the sub-bypass passage 2b, and the sensor chip 3 may be installed in the sub-bypass passage 2b to oppose the bulge 2wa. In such a case, the gap dimension D between the sensor chip 3 and the inner wall surface 2b1 of the sub-bypass passage 2b may be measured between the sensor chip 3 and a portion of the bulge 2wa, which is opposed to the sensor chip 3, as shown in FIG. 8B.

Furthermore, the sensor chip 3 may be placed in the bypass passage 2a in a case of an air flow meter, which has the bypass passage 2a but does not have the sub-bypass passage 2b.

In the above embodiments, the estimation equation is used. Alternative to the estimation equation, a map may be used.

What is claimed is:

1. An air flow rate adjusting apparatus for an air flow meter that is configured to measure a flow rate of air and includes a sensor chip, which has a sensor device installed in a thin wall portion to measure the flow rate of the air, and a support plate, which supports the sensor chip placed in the support plate and forms a gap between the sensor chip and the support plate to conduct the air through the gap, the air flow rate adjusting apparatus comprising a controller configured to adjust an output of the air flow meter based on an assembly dimension of the sensor chip relative to the support plate, wherein the assembly dimension is a dimension of the gap formed between a back surface of the sensor chip and the support plate.

2. The air flow rate adjusting apparatus according to claim 1, wherein the controller is configured to change an estimation equation, which is used to obtain a flow rate error, based on the assembly dimension.

3. The air flow rate adjusting apparatus according to claim 1, wherein the assembly dimension is stored in an internal memory of the air flow meter.

4. An air flow rate adjusting apparatus for an air flow meter that measures a flow rate of air and includes a sensor chip, which is inserted in a bypass flow path formed to conduct a portion of the air and has a sensor device installed in a thin wall portion to measure the flow rate of the air, the air flow rate adjusting apparatus comprising a controller that is configured to adjust an output of the air flow meter based on a dimension of a gap between the sensor chip and an inner wall surface of a passage of a housing to be installed in an intake duct while the sensor chip is installed in the passage of the housing.

5. An air flow rate adjusting apparatus for an air flow meter that is configured to measure a flow rate of air and includes a sensor chip, which has a sensor device installed in a thin wall portion to measure the flow rate of the air, the air flow rate adjusting apparatus comprising a controller, wherein:

the controller is configured to estimate at least one estimated output of the air flow meter at at least one predetermined flow rate of the air based on:
measured geometric data, which includes a gap between the sensor chip and an adjacent wall; and
at least two measured outputs of the air flow meter, which are measured at at least two different flow rates of the air that are different from the at least one predetermined flow rate of the air; and the controller is configured to store the at least one estimated output and the at least two measured outputs of the air flow meter and required adjustment data, which is required to adjust each of the at least one estimated output and the at least two measured outputs of the air flow meter to a corresponding target output of the air flow meter, in a memory of the air flow meter.

6. The air flow rate adjusting apparatus according to claim 5, wherein the controller is configured to retrieve the measured geometric data of the sensor chip from the memory of the air flow meter when the controller estimates the at least one estimated output of the air flow meter.

7. An air flow rate adjusting apparatus for an air flow meter that is configured to measure a flow rate of air and includes a sensor chip, which has a sensor device installed in a thin wall portion to measure the flow rate of the air, and a support plate, which supports the sensor chip placed in the support plate and forms a gap between the sensor chip and the support plate to conduct the air through the gap, the air flow rate adjusting apparatus comprising a controller configured to adjust an output of the air flow meter based on an assembly dimension of the sensor chip relative to the support plate, wherein:

the assembly dimension is one of a plurality of assembly dimensions; and the controller is configured to adjust the output of the air flow meter based on the plurality of assembly dimensions.

8. The air flow rate adjusting apparatus according to claim 7, wherein the controller is configured to change an estimation equation, which is used to obtain a flow rate error, based on the assembly dimension.

9. The air flow rate adjusting apparatus according to claim 7, wherein the assembly dimension is stored in an internal memory of the air flow meter.

10. An air flow rate adjusting apparatus for an air flow meter that is configured to measure a flow rate of air and includes a sensor chip, which has a sensor device installed in a thin wall portion to measure the flow rate of the air, and a support plate, which supports the sensor chip placed in the support plate and forms a gap between the sensor chip and the support plate to conduct the air through the gap, the air flow rate adjusting apparatus comprising a controller configured to adjust an output of the air flow meter based on an assembly dimension of the sensor chip relative to the support plate, wherein:

the controller is configured to measure an unadjusted output of the air flow meter at each of two or more reference air flow rates; and the controller is configured to estimate an unadjusted output of the air flow meter at an unmeasured flow rate based on the measured output value at each of the two or more reference air flow rates, a target output at each of the two or more reference air flow rates, and a target output at the unmeasured flow rate.

11. The air flow rate adjusting apparatus according to claim 10, wherein the controller is configured to change an estimation equation, which is used to obtain a flow rate error, based on the assembly dimension.

12. The air flow rate adjusting apparatus according to claim 10, wherein the assembly dimension is stored in an internal memory of the air flow meter.

13. An air flow rate adjusting apparatus for an air flow meter that is configured to measure a flow rate of air and includes a sensor chip, which has a sensor device installed in a thin wall portion to measure the flow rate of the air, and a support plate, which supports the sensor chip placed in the support plate and forms a gap between the sensor chip and the support plate to conduct the air through the gap, the air flow rate adjusting apparatus comprising a controller configured to adjust an output of the air flow meter based on an assembly dimension of the sensor chip relative to the support plate, wherein the controller is configured to obtain adjustment data based on the assembly dimension and is configured to determine that the air flow meter is a defective product upon satisfaction of one of the following two conditions:

the assembly dimension is larger than an upper threshold dimension; and the assembly dimension is smaller than a lower threshold dimension.

14. The air flow rate adjusting apparatus according to claim 13, wherein the controller is configured to change an estimation equation, which is used to obtain a flow rate error, based on the assembly dimension.

15. The air flow rate adjusting apparatus according to claim 13, wherein the assembly dimension is stored in an internal memory of the air flow meter.

* * * * *